United States Patent
Gaske

(10) Patent No.: US 11,177,875 B2
(45) Date of Patent: *Nov. 16, 2021

(54) PRECISE BEAM FORMING BASED ON USER EQUIPMENT LOCATION

(71) Applicant: Hughes Network Systems, LLC, Germantown, MD (US)

(72) Inventor: T. Paul Gaske, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/987,108

(22) Filed: Aug. 6, 2020

(65) Prior Publication Data

US 2020/0382203 A1 Dec. 3, 2020

Related U.S. Application Data

(63) Continuation of application No. 16/042,384, filed on Jul. 23, 2018, now Pat. No. 10,763,954.

(51) Int. Cl.
| | | |
|---|---|---|
| *H04B 7/185* | (2006.01) | |
| *H04W 4/02* | (2018.01) | |
| *H04W 16/28* | (2009.01) | |
| *H04W 64/00* | (2009.01) | |
| *H04W 72/04* | (2009.01) | |

(52) U.S. Cl.
CPC ........ *H04B 7/18513* (2013.01); *H04W 4/025* (2013.01); *H04W 16/28* (2013.01); *H04W 64/00* (2013.01); *H04W 72/0446* (2013.01)

(58) Field of Classification Search
CPC ..... H04W 4/025; H04W 16/28; H04W 64/00; H04W 72/0446; H04B 7/18513

USPC ......................................................... 370/316
See application file for complete search history.

(56) References Cited

U.S. PATENT DOCUMENTS

| | | | |
|---|---|---|---|
| 5,612,701 | A | 3/1997 | Diekelman |
| 7,706,748 | B2 | 4/2010 | Dutta |
| 8,712,321 | B1 | 4/2014 | Dankberg |

(Continued)

FOREIGN PATENT DOCUMENTS

| | | |
|---|---|---|
| GB | 2 521 459 A | 6/2015 |
| WO | 2014/001837 A1 | 1/2014 |
| WO | 2014/043760 A1 | 3/2014 |

OTHER PUBLICATIONS

International Search Report and Written Opinion for PCT/US2019/041416 dated Oct. 7, 2019, all pages.

(Continued)

*Primary Examiner* — Gbemileke J Onamuti
(74) *Attorney, Agent, or Firm* — Kilpatrick Townsend & Stockton LLP

(57) ABSTRACT

Various arrangements are presented for optimizing data transmission between a satellite and a user equipment. A satellite gateway system may receive a message from the user equipment indicative of a current location of the user equipment. Data may be retrieved from the Internet to be transmitted to the user equipment via the satellite. The satellite gateway system may transmit a downlink message to the satellite that comprises the retrieved data and beam steering data. The beam steering data may instruct the satellite to target a downlink spot beam on the current location of the user equipment based on the message received from the user equipment. The retrieved data may be transmitted to the user equipment via the targeted downlink spot beam.

20 Claims, 8 Drawing Sheets

(56) References Cited

U.S. PATENT DOCUMENTS

| 10,763,954 B2 | 9/2020 | Gaske |
| 2002/0058477 A1 | 5/2002 | Chapelle |
| 2002/0077099 A1 | 6/2002 | Laprade |
| 2002/0122408 A1 | 9/2002 | Mullins |
| 2013/0252655 A1 | 9/2013 | Kim et al. |
| 2017/0041066 A1 | 2/2017 | Chu |
| 2018/0024540 A1 | 1/2018 | Livesay et al. |
| 2018/0034540 A1 | 2/2018 | Buer et al. |
| 2018/0287694 A1 | 10/2018 | Buehler et al. |
| 2019/0253900 A1 | 8/2019 | Narasimha et al. |

OTHER PUBLICATIONS

International Search Report and Written Opinion for PCT/US2019/041415 dated Oct. 7, 2019, all pages.
International Preliminary Report on Patentability for PCT/US2019/041416 dated Jan. 26, 2021, all pages.
International Preliminary Report on Patentability for PCT/US2019/041415 dated Jan. 26, 2021, all pages.

PRECISE BEAM FORMING BASED ON USER EQUIPMENT LOCATION

CROSS-REFERENCES TO RELATED APPLICATIONS

This application is a continuation of U.S. patent application Ser. No. 16/042,384, filed Jul. 23, 2018, entitled "Precise Beam Forming Based On User Equipment Location." U.S. patent application Ser. No. 16/042,384 is also related to U.S. patent application Ser. No. 16/042,392, filed on Jul. 23, 2018, entitled "Dynamic Allocation Of Satellite Gateway Assignments." The disclosures of the above-identified patent applications are incorporated by reference in their entirety for all purposes.

BACKGROUND

A relay satellite may be used to relay data transmitted between one or more satellite gateway systems and user equipment. Typically, relay satellites transmit and receive using wide-area antenna signal beams with user equipment distributed over large swaths of geography, such as regions over a hundred miles in diameter. Due to variances in signal strength, user terminals located at or near a center of the such wide-area beams may experience a relatively high signal strength that allows for data to be transmitted and received with a relatively low error rate between the relay satellite and the user terminal. However, for user equipment positioned further from the center of the beam, a lower signal strength will be experienced that allows for data to be transmitted and received at a slower speed or more coding due to increased error correction being used to overcome the decreased signal strength. An increased data throughput would be beneficial both to users of user equipment (e.g., less delay in transmitting or receiving data) and to an operator of the satellite-based system by the relay satellite being able to accommodate more user terminals if less time is devoted to communicating with user terminals with which only lower data rates are possible.

SUMMARY

Various embodiments are described related to a method for optimizing data transmission between a satellite and a user equipment. In some embodiments, a method for optimizing data transmission between a satellite and a user equipment is described. The method may include receiving, by a satellite gateway system, a message, from the user equipment indicative of a current location of the user equipment. The method may include retrieving, by the satellite gateway system, data from the Internet to be transmitted to the user equipment via the satellite. The method may include transmitting, by the satellite gateway system, a downlink message to the satellite that comprises the retrieved data and beam steering data. The beam steering data may instruct the satellite to target a spot beam on the current location of the user equipment based on the message received from the user equipment, such that the retrieved data may be transmitted to the user equipment via the targeted downlink spot beam.

Embodiments of such a method may include one or more of the following features: The beam-steering data instructing the satellite to target the downlink spot beam on the current location of the user equipment may include the downlink spot beam being centered on the current location of the user equipment. The beam-steering data instructing the satellite to target the downlink spot beam on the current location of the user equipment may include the downlink spot beam being centered within a predefined distance on the current location of the user equipment. The message indicative of the current location of the user equipment may include an account number linked with the user equipment. The message indicative of the current location of the user equipment may include a latitude value and a longitude value. The method may include storing, by the satellite, a lookup table that maps a plurality of spot beam identifiers to a corresponding plurality of spot beam target locations. The beam steering data may include a spot beam identifier. The method may include performing, by the satellite, a lookup in the lookup table based on the beam steering data. The method may include performing, by the satellite, a beam-forming process based on the lookup to target the downlink spot beam to the user equipment based on the lookup. The method may include transmitting, by the satellite gateway system, a second downlink message to the satellite that comprises broadcast data to be transmitted to a plurality of instances of user equipment that comprises the user equipment. The second downlink message may be transmitted via a downlink wide area beam distributed over a larger geographical area than the downlink spot beam. The method may include receiving, by the satellite gateway system via the satellite, during a first defined period of time, a request message from the user equipment requesting to send an amount of data to the satellite gateway system via the satellite. The request message may indicate the current location of the user equipment. The method may include assigning, by the satellite gateway system, a time slot for the user equipment to transmit the amount of data to the satellite gateway system. The method may include transmitting, by the satellite gateway system, a time slot assignment message to the user equipment that indicates the time slot. The method may include causing, by the satellite gateway system, the satellite to target up-stream focus for the time slot on the current location of the user equipment. The method may include receiving, by the satellite gateway system via the satellite, data from the user equipment transmitted during the time slot. A beam width of the downlink spot beam may be sixty miles or less. A frequency of the downlink spot beam may be 30 GHz or greater.

In some embodiments, a system optimizing data transmission is described. The system may include user equipment comprising a first satellite antenna that transmits, to a satellite, a message indicative of a current location of the user equipment. The system may include a satellite gateway system comprising: a second satellite antenna that communicates with the satellite. The satellite gateway system may be configured to receive the message from the satellite that is indicative of the current location of the user equipment. The satellite gateway system may be configured to retrieve data from the Internet to be transmitted to the user equipment via the satellite. The satellite gateway system may be configured to transmit a downlink message to the satellite that comprises the retrieved data and beam steering data. The beam steering data may instruct the satellite to target a spot beam on the current location of the user equipment based on the message received from the user equipment, such that the retrieved data may be transmitted to the user equipment via the targeted downlink spot beam.

Embodiments of such a system may include one or more of the following features: The system may include the satellite. The beam steering data instructing the satellite to target the downlink spot beam on the current location of the user equipment may include the satellite centering the downlink spot beam on the current location of the user equipment. The beam steering data instructing the satellite to target the downlink spot beam on the current location of the user equipment may include the downlink spot beam being centered within a predefined distance on the current location of the user equipment. The message indicative of the current location of the user equipment may include an account number linked with the user equipment. The message indicative of the current location of the user equipment may include a latitude value and a longitude value. The system may further include the satellite. The satellite may be configured to store a lookup table that maps a plurality of spot beam identifiers to a corresponding plurality of spot beam target locations. The beam steering data may include a spot beam identifier. The satellite may be configured to perform a lookup in the lookup table based on the beam steering data. The satellite may be configured to perform a beam-forming process based on the lookup to target the downlink spot beam to the user equipment based on the lookup. The satellite gateway system may be further configured to transmit a second downlink message to the satellite that comprises broadcast data to be transmitted to a plurality of instances of user equipment that comprises the user equipment. The second downlink message may be transmitted via one or more downlink wide area beams distributed over a larger geographical area than the downlink spot beam. The satellite gateway system may be further configured to receive, via the satellite, during a first defined period of time, a request message from the user equipment requesting to send an amount of data to the satellite gateway system via the satellite. The request message may indicate the current location of the user equipment. The satellite gateway system may be further configured to assign a time slot for the user equipment to transmit the amount of data to the satellite gateway system. The satellite gateway system may be further configured to transmit a time slot assignment message to the user equipment that indicates the time slot. The satellite gateway system may be further configured to cause the satellite to target up-stream focus for the time slot on the current location of the user equipment. The satellite gateway system may be further configured to receive, via the satellite, data from the user equipment transmitted during the time slot. A beam width of the downlink spot beam may be sixty miles or less. A frequency of the downlink spot beam may be 30 GHz or greater.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
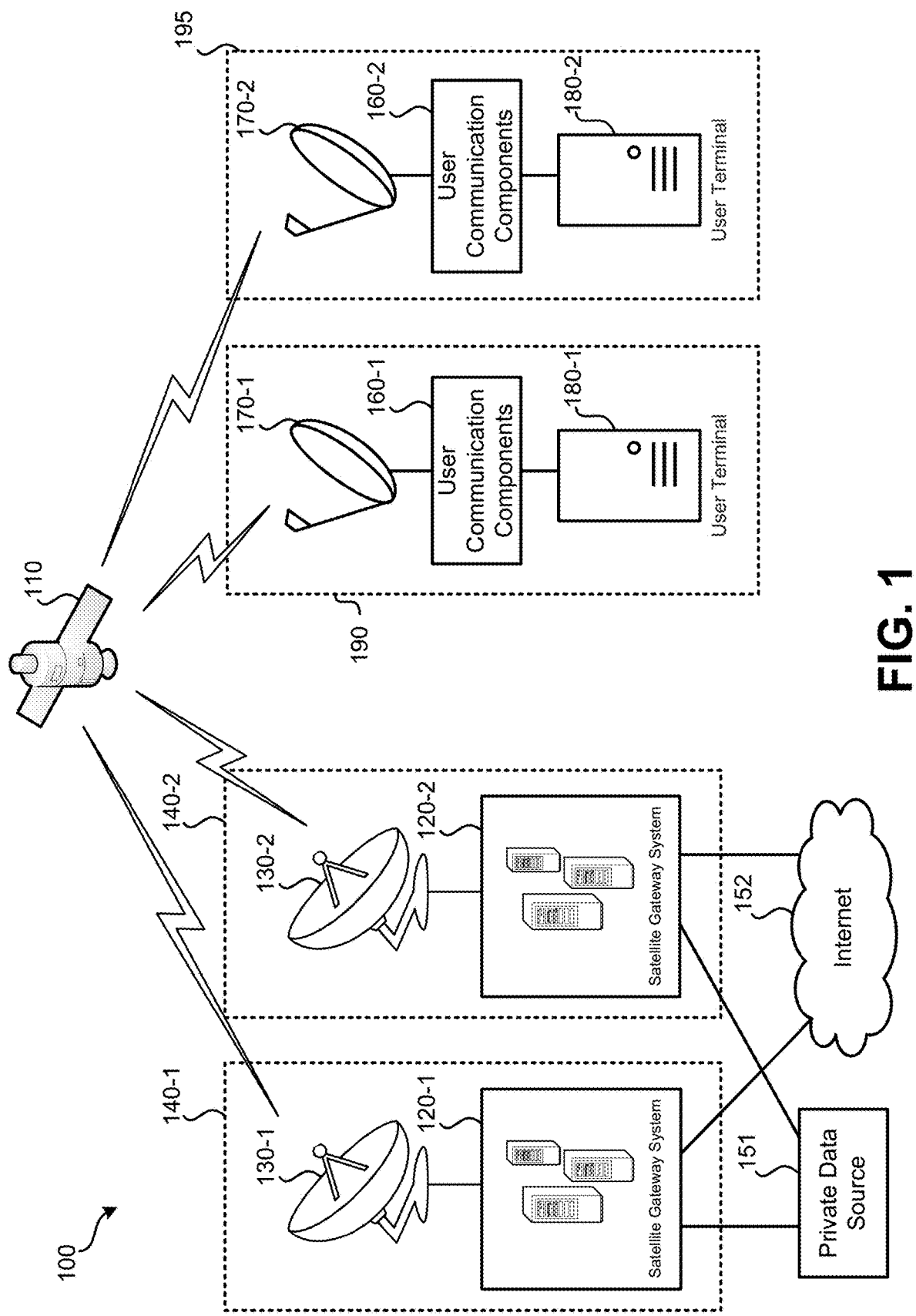
FIG. 1 illustrates an embodiment of a bidirectional satellite communication system.

The radiation pattern for an antenna can exhibit a high degree of directionality based on the size of the antenna and the frequency at which the antenna is operating. The size of the antennas of relay satellites may be increased as may the operating frequency in order to increase the data throughput of the relay satellite and also the directionality of the relay satellite's one or more antennas. The higher the directionality, the more focused the signal, resulting in more signal gain in a smaller area. Conventionally, a relay satellite that is used to provide unidirectional or bidirectional communication with many instances of user equipment may have a wide-area antenna radiation pattern that covers a large swath of geography, such as over a hundred miles in diameter. Within this geography, many user terminals may be positioned. Since a large number of user terminals can be expected to be present within the wide-area beam, bandwidth usage across the user equipment may statistically average together to be roughly consistent or at least not experience significant short-term spikes or drop-offs. That is, while a first group of user equipment serviced by the wide-area beam may be receiving and/or transmitting a large amount of data, a second group of user equipment may be receiving and/or transmitting little or no data. At another time, the user equipment part of the second group may be more active in transmitting and/or receiving data, while some terminals that are part of the first group may be less active.

If the antenna size and/or operating frequency of the one or more communication channels between the relay satellite and user terminals are increased, the antenna radiation pattern of the relay satellite's antenna may exhibit greater directionality or focus. Therefore, a small geographic region at which the antenna is targeted may experience high gain, while untargeted geographic regions may experience a low gain. Such an antenna radiation pattern may be referred to as a spot beam. A spot beam operating at a frequency of 30 GHz or greater (e.g., $K_a$, Q, V, and higher frequency bands) may have a 3 dB beam-width of 60, 40, 20, or even fewer miles. That is, the diameter of the transmit or receive spot beam, as measured on the earth's surface, may have a distance of between 20 to 60 miles between 3 dB decreases in signal strength as compared to the center or approximate center of the beam as present on the earth's surface.

Due to the highly directional antenna beam pattern, spot beams exhibit a large signal strength roll-off over a relatively short distance. Therefore, if a user terminal is located near the 3 dB edge of the spot beam, the user equipment may receive approximately only half as much power as user equipment located on the ground at or near the center of the spot beam. Similarly, a satellite may only provide half of the gain for a signal received from the user terminal on the 3 dB edge versus a user terminal at the limits of the beam. The first instance of user equipment may need to perform a significant amount of error correction that effectively decreases the data bandwidth by a large percentage, such as 50%. Further, since the spot beam effectively covers such a smaller geographic region, the number of instances of user equipment that can effectively be serviced by the spot beam is reduced. While bandwidth usage may be statistically averaged to be roughly consistent over a large geographic area serviced using a wide-area antenna beam pattern, the ability to average out bandwidth usage over a number of instances of user equipment within a smaller spot beam is reduced since the number of user terminals within the spot beam is fewer. Accordingly, unless additional measures are taken, a situation may arise in which a significant amount of bandwidth of a spot beam may be wasted and ultimately the capacity of the satellite may be reduced.

Embodiments detailed herein are focused on steering (also referred to as aiming or targeting) the antenna radiation patterns of the relay satellite such that individual or small groups of user equipment located in close proximity to each other experience high gain. Based on where user equipment is located, a spot beam may be steered such that the user equipment is located at or near the center the spot beam. The user equipment may transmit data to the relay server and/or a gateway satellite system that indicates a location of the user equipment. In some instances, such as if the user equipment may move (e.g., located on an airplane, unmanned aerial vehicle, boat, or vehicle), the user equipment may provide a precise location, such as in the form of latitude and longitude coordinates. In some embodiments, location information may be provided in the form of a user equipment identifier or account identifier that allows the satellite gateway system to determine the location of the user equipment, such as by looking up an address or latitude and longitude coordinates in an account database. Regardless of whether the user terminal is in a stationary location (e.g., at a home, office, fixed field location, or other stationary structure) or may move, the user equipment's location may be used to aim the spot beam of the relay antenna directly at or nearly directly at the user equipment when the user equipment is to receive data from or transmit data to the relay satellite. By ensuring that the user terminal is located at or near the beam center (e.g., with a signal loss of less than 1-3 dB as compared to the beam center or within a predefined distance of the beam center), the transmit and receive information bandwidth between the user terminal and the satellite may be increased.

Further detail regarding these concepts is provided in relation to the figures. FIG. 1 illustrates an embodiment of a bidirectional satellite communication system 100. Bidirectional satellite communication system 100 may include: relay satellite 110; satellite gateway systems 120; bidirectional satellite communication links 130; private data source 151; user communication components 160; satellite antennas 170; and user terminals 180. Relay satellite 110 may be a bidirectional communication satellite that relays communications between satellite gateway systems 120 and user communication components 160. Therefore, via relay satellite 110, data may be transmitted from satellite gateway systems 120 to user communication components 160 and data may be transmitted from user communication components 160 to satellite gateway systems 120. In some embodiments, system 100 may be used to provide user communication components 160 with Internet access. Additionally or alternatively, system 100 may be used to provide user communication components 160 with access to private data source 151, which may be a private network, data source, or server system. Relay satellite 110 may use different frequencies for communication with satellite gateway systems 120 than for communication with user communication components 160. Further, different frequencies may be used for uplink communication (from user equipment to relay satellite 110 and to a satellite gateway system) than for downlink communication (from a satellite gateway system to relay satellite 110 and to user equipment). Similarly, different frequencies may be used for communication from satellite gateway systems 120 to relay satellite 110 than for communication from relay satellite 110 to satellite gateway systems 120. Further detail regarding relay satellite 110 is provided in reference to FIG. 2.

Satellite gateway system 120-1 may be located at geographic location 140-1. Satellite gateway system 120-1 may communicate with relay satellite 110 using bidirectional satellite communication link 130-1, which can include one or more high-gain antennas that allow high data transmission rates between satellite gateway system 120-1 and relay satellite 110. Satellite gateway system 120-1 may receive data from and transmit data to many instances of user equipment, such as user communication components 160. Satellite gateway system 120-1 may serve to encode data into a proper format for relay by relay satellite 110. Similarly, satellite gateway system 120-1 may serve to decode data received from various instances of user communication components 160 received via relay satellite 110. Satellite gateway system 120-1 may serve as an intermediary between the satellite communication system and other data sources, such as private data source 151 and Internet 152. Satellite gateway system 121 may serve to receive requests from user communication components 160 via relay satellite 110 for data accessible using Internet 152. Satellite gateway system 120-1 may retrieve such data from Internet 152 and transmit the retrieved data to the requesting instance of user equipment via relay satellite 110. Additionally or alternatively, satellite gateway system 120-1 may receive requests from user communication components 160 via relay satellite 110 for data accessible in private data source 151. Satellite gateway system 120-1 may retrieve such data from private data source 151 and transmit the retrieved data to the requesting instance of user equipment via relay satellite 110. Further detail regarding a satellite gateway system, such as satellite gateway system 120-1, is provided in relation to FIG. 2.

Satellite gateway system 120-2 may function similarly to satellite gateway system 120-1, but may be located in a different physical location. While satellite gateway system 120-1 is located at geographic location 140-1, satellite gateway system 120-2 is located at geographic location 140-2. Co-located with satellite gateway system 120-2 may be bidirectional satellite communication link 130-2. Satellite gateway system 120-2 and bidirectional satellite communication link 130-2 may service a first group of user equipment while satellite gateway system 120-1 and bidirectional satellite communication link 130-1 may service another set of user equipment. Geographic locations 140-1 and 140-2 may be separated by a significant enough distance such that the same frequencies can be used for uplink and downlink communications between bidirectional satellite communication links 130 and relay satellite 110 without a significant amount of interference occurring. Satellite gateway system 120-2 and bidirectional satellite communication link 130-2 may function similarly to satellite gateway system 120-1 and bidirectional satellite communication link 130-1 respectively. While two instances of satellite gateway systems 120 and bidirectional satellite communication links 130 are illustrated as part of system 100, it should be understood that in some embodiments only a single satellite gateway system and a single bidirectional satellite communication link system are present or a greater number of satellite gateway systems 120 and bidirectional satellite communication links 130 are present. For example, for a satellite-based Internet service provider, four to eight satellite gateway systems 120 and associated bidirectional satellite communication links 130 may be scattered geographically throughout a large region, such as North America.

User communication components 160, along with user terminals 180 and satellite antennas 170 (which can collectively be referred to as "user equipment") may be located in a fixed geographic location or may be mobile. For example, user communication components 160-1, satellite antenna 170-1, and user terminal 180-1 may be located at a residence of a subscriber that has a service contract with the operator of satellite gateway systems 120. User communication components 160-1, satellite antenna 170-1, and user terminal 180-1 may be located at a fixed location 190. Fixed location 190 may be a residence, a building, an office, a worksite, or any other fixed location at which access to Internet 152 and/or private data source 151 is desired. User communication components 160-2, satellite antenna 170-2, and user terminal 180-2 may be mobile. For instance, such equipment may be present in an airplane, ship, vehicle, or temporary installation. Such equipment may be present at geographic location 195; however, geographic location 195 may change frequently or constantly, such as if the airplane, ship, or vehicle is in motion.

Satellite antenna 170-1 may be a small dish antenna, approximately 50 to 100 centimeters in diameter. Satellite antenna 170-1 may be mounted in a location that is pointed towards relay satellite 110, which may be in a geosynchronous orbit around the earth. As such, the direction in which satellite antenna 170-1 is to be pointed stays constant. In some embodiments, low Earth orbit (LEO) and medium Earth orbit (MEO) satellites may be used in place of a geosynchronous satellite in the system. User communication component 160-1 refers to the hardware necessary to translate signals received from relay satellite 110 via satellite antenna 170-1 into a format which user terminal 180-1 can decode. Similarly, user communication components 160-1 may encode data received from user terminal 180-1 into a format for transmission via satellite antenna 170-1 to relay satellite 110. User communication components 160-1 may include a satellite communication modem. This modem may be connected with or may have incorporated a wired or wireless router to allow communication with one or more user terminals. In system 100, a single user terminal, user terminal 180-1, is shown in communication with user communication components 160-1. It should be understood that, in other embodiments, multiple user terminals may be in communication with user communication components 160-1 and using system 100 to access private data source 151 and/or Internet 152. User terminal 180-1 may be various forms of computerized devices, such as: a desktop computer; a laptop computer; a smart phone; a gaming system or device; a tablet computer; a music player; a smart home device; a smart sensor unit; Voice over IP (VoIP) device, or some other form of computerized device that can access Internet 152 and/or private data source 151. Since user communication components and a satellite antenna can continue communicating with a satellite gateway system even if a user terminal is not currently communicating with user communication components 160-1, it should be understood that some instances of user equipment may not include a user terminal.

Despite being in motion or in a temporary location, user communication components 160-2, satellite antenna 170-2, and user terminal 180-2 may function similarly to user communication components 160-1, satellite antenna 170-1, and user terminal 180-1. In some instances, satellite antenna 170-2 may either physically or electronically point its antenna beam pattern at relay satellite 110. For instance, as a flight path of an airplane changes, satellite antenna 170-2 may need to be aimed in order to receive data from and transmit data to relay satellite 110. As discussed in relation to user terminal 180-1, only a single user terminal, user terminal 180-2, is illustrated as in communication with user communication components 160-2 as part of system 100. It should be understood that in other embodiments, multiple user terminals may be in communication with user communication components 160-2. For example, if such equipment is located on an airplane, many passengers may have computerized devices, such as laptop computers and smart phones, which are communicating with user communication components 160-2 for access to Internet 152 and/or private data source 151. As detailed in relation user terminal 180-1, user terminal 180-2 may be various forms of computerized devices, such as those previously listed.

While FIG. 1 illustrates only two instances of user communication components 160, two instances of satellite antennas 170, and two instances of user terminals 180, it should be understood that this is for illustration purposes only. System 100 may involve hundreds or thousands of instances of satellite antennas, user equipment, and user terminals distributed across various geographic locations. Some number of these instances may be located in fixed locations while some of these instances, that periodically or constantly are changing in location, may be mobile. For the purposes of this document, it can be assumed that the position of user equipment, the satellite antenna to which the user equipment is in communication, and the one or more user terminals in communication with the user equipment are at the same location. While a user terminal may wirelessly communicate with user equipment from a short distance away (e.g., within 500 ft.), it can be assumed for the purposes of this document that the location of, for example, satellite antenna 170-1, user communication components 160-1, and user terminal 180-1 is the same location.

Figure 2:
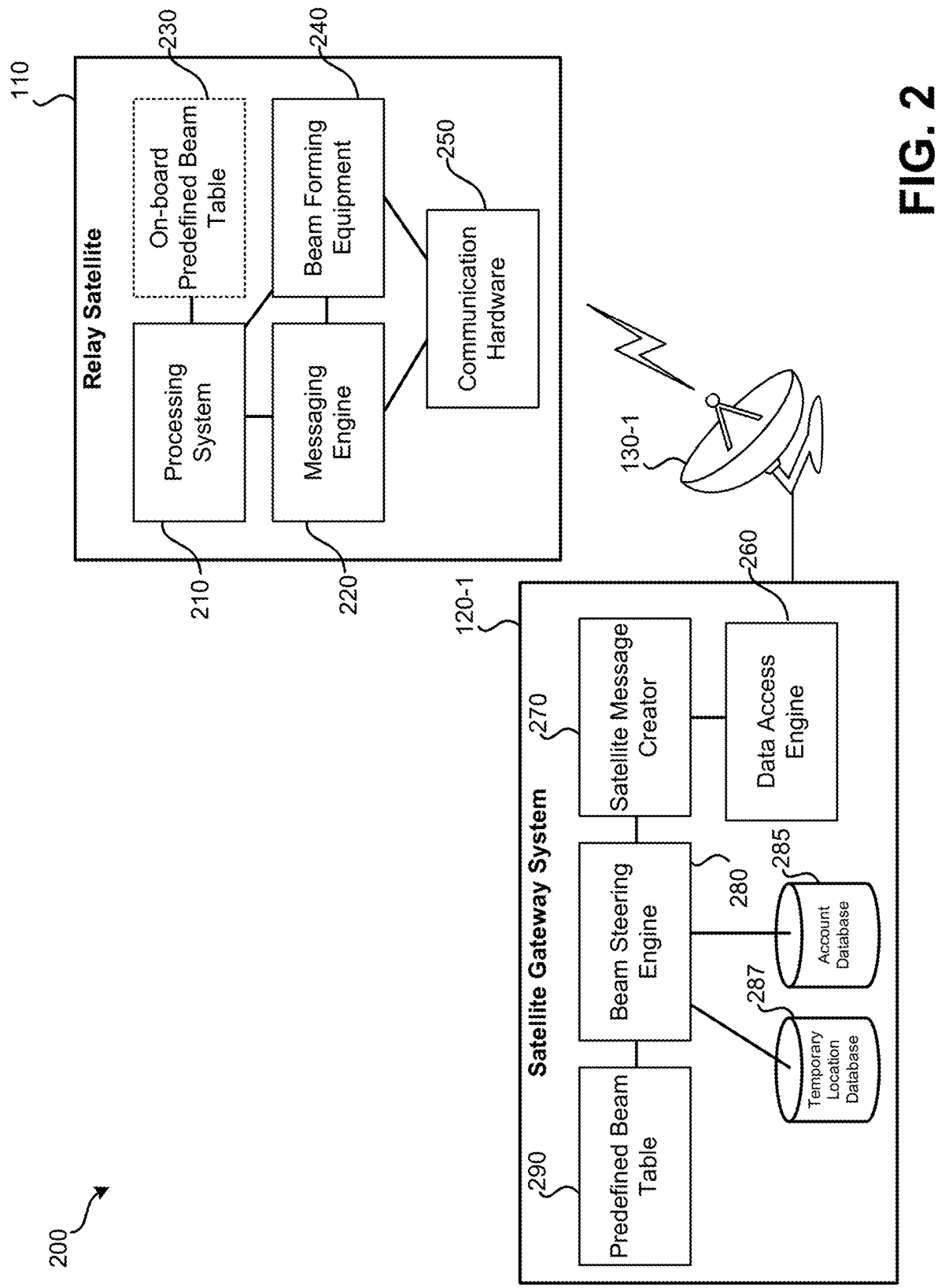
FIG. 2 illustrates an embodiment of a satellite gateway system and relay satellite.

FIG. 2 illustrates an embodiment 200 of a satellite gateway system and relay satellite. Embodiment 200 illustrates a greater level of detail of satellite gateway system 120-1 and relay satellite 110 than is shown in FIG. 1. Referring first to relay satellite 110, relay satellite 110 may include: processing system 210; messaging engine 220; onboard predefined beam table 230; beam forming equipment 240; and communication hardware 250. Processing system 210 may include one or more processors and may serve to perform various forms of processing onboard relay satellite 110. For instance, processing system 210 may receive various commands of how to electronically align (i.e., steer) one or more antennas, change a physical alignment of an antenna, or reposition the satellite. Messaging engine 220 may serve to relay messages, such as in the form of data packets, between satellite gateway system 120-1 and one or more user terminals that are accessible via satellite antennas. Messaging engine 220 may further analyze a portion of the received message to determine how an antenna beam should be steered for future communication with a particular instance of user equipment. For instance, messaging engine 220 may receive messages from user terminals via communication hardware 250 and/or may receive messages from satellite gateway system 120-1 that provide beam steering data. Such beam steering data may be provided to beam forming equipment 240, which may change electrical characteristics of a satellite antenna, such as a phased array, that is part of communication hardware 250. A phased array may consist of a number of radiation elements whose phase and amplitude may be adjusted such that the superposition of the radiation pattern from the elements creates spot beams focused on specific user terminals. By various electrical characteristics of a satellite antenna being changed, the antenna's radiation pattern may be altered. The resulting spot beams created by the antenna may be moved to different locations over time.

Beam forming equipment 240 may serve to alter the electrical characteristics of one or more pieces of communication hardware 250 to target the one or more satellite antennas' spot beams. Such altering of the antenna beam pattern for communication with user equipment may affect both a transmit (downlink) beam pattern and receive (uplink) beam pattern. By beam forming equipment 240 altering electrical characteristics of communication hardware 250, both the effective size of a beam (e.g., wide-area spot beams having a larger diameter distance between 3 dB signal strength drops as compared to the signal strength at the center of the beam, or a spot beam having a smaller distance between 3 dB signal strength drops as compared to the signal strength at the center of the beam) and the direction in which the beam is pointed. Communication hardware 250 may include one or more satellite antennas and one or more transponders that serve to relay data between satellite gateway system 120-1 and instances of user terminals and user equipment.

In some embodiments, on-board predefined beam table 230 may be stored using a non-transitory processor readable medium and may be accessible by processing system 210. On-board predefined beam table 230 may store beam steering data that define various antenna beam patterns that relate to locations of individual instances of user equipment or relate to predefined locations within a geographical area. The phase and amplitude of the phased array elements would be used to create the desired spot beams. For instance, onboard predefined beam table 230 may store a multitude of beam patterns that can be used to configure communication hardware 250 such that a large number of regions within the larger geographical area can be targeted using a spot beam such that signal strength is within 0.3 dB to 2 dB of the signal strength or gain of the center of the beam. Each of these beam definitions may be linked with a unique spot beam identifier within onboard predefined beam table 230. Therefore, if one or more packets of data are to be transmitted to user equipment located in a particular location, satellite gateway system 120-1 may provide the spot beam identifier to relay satellite 110. Based on the spot beam identifier, beam forming equipment 240 may electronically alter characteristics of communication hardware 250 such that the desired user equipment is targeted by the antenna beam pattern for transmitting the one or more packets to the user equipment. In some embodiments, based on location data (e.g., coordinates) received by processing system 210, processing system 210 may be able to calculate the beam steering data needed to control beam forming equipment 240 and communication hardware 250.

In other embodiments, rather than having processing performed at relay satellite 110, functionality of onboard predefined beam table 230 may be performed by satellite gateway system 120-1. Satellite gateway system 120-1 may provide beam steering data to relay satellite 110 that instructs beam forming equipment 240 how to configure an antenna radiation pattern of communication hardware 250 to target a particular piece or set of user equipment. Satellite gateway system 120-1 may include: data access engine 260; satellite message creator 270; beam steering engine 280; account database 285; and predefined beam table 290. Predefined beam table 290 may function similarly to onboard predefined beam table 230. That is, if satellite gateway system 120-1 has one or more packets of data that are to be transmitted to a particular instance of user equipment, beam steering engine 280 may access predefined beam table 290 to look up beam steering data necessary to create a particular spot beam. This beam steering data may be transmitted to beam forming equipment 240 such that communication hardware 250 can be configured to create the spot beam for transmitting and receiving data with the desired user equipment. In such embodiments, the processing necessary to perform lookups and store a beam table is performed by satellite gateway system 120-1 rather than relay satellite 110. In such embodiments, relay satellite 110 receives the particular beam steering data necessary for beamforming equipment 240 to configure communication hardware 250 to create the desired spot beam.

In some embodiments, beam steering engine 280 may access account database 285 in order to determine a location of user equipment. For example, a message from the user equipment may indicate an account identifier or user equipment identifier. This account identifier user equipment identifier may be used to perform a lookup in account database 285 to determine an address or other form of location linked with the account identifier or user equipment identifier. This location may be stored in the form of an address or coordinates. If stored in the form of an address, a further look up or analysis may be performed to determine coordinates, that correspond to the address. In some embodiments, account database 285 may link account identifiers or user equipment identifiers directly with beamforming settings. Temporary location database 287 may be used to store the location, such as in the form of latitude and longitude coordinates, of user equipment that is either moving or is only temporarily stationary. When a message is received from such an instance of user equipment, indication of location, such as in the form of latitude and longitude coordinates may be received by satellite gateway system 120-1. The location, along with an account identifier or user equipment identifier, may be stored to temporary location database 287 such that a location of the user equipment is accessible for future instances when data is to be received or transmitted. Similar to account database 285, in some embodiments, the beam forming settings may be stored directly linked with the account identifier or user equipment identifier stored in temporary location database 287. In some embodiments, based on location data (e.g., coordinates) received by beam steering engine 280, beam steering engine 280 may be able to calculate the beam steering data needed to control beam forming equipment 240 and communication hardware 250. This calculated beam steering data may be transmitted to relay satellite 110 via satellite message creator 270.

Satellite message creator 270 may serve to create messages for transmission via bidirectional satellite communication link 130-1 to relay satellite 110. Messages created by satellite message creator 270 may include one or more data packets. The data transmitted as part of such messages may include beam steering data and the data to be relayed. Data access engine 260 may serve to access one or more external data sources, such as Internet 152 or private data source 151. That is, data access engine 260 may request and retrieve information based on received requests from user terminals.

While not illustrated as part of FIG. 2, satellite gateway system 120-1 may include one or more computer server systems. Beam steering engine 280, satellite message creator 270, and data access engine 260 may be implemented using software, firmware, and/or underlying computerized hardware. Such computer server systems may include one or more network interfaces, one or more processors, non-transitory computer readable storage mediums, communication buses, user interfaces, and other forms of computerized components. It should be understood that other satellite gateway systems, such as satellite gateway system 120-2, may function similarly to satellite gateway system 120-1.

Figure 3A:
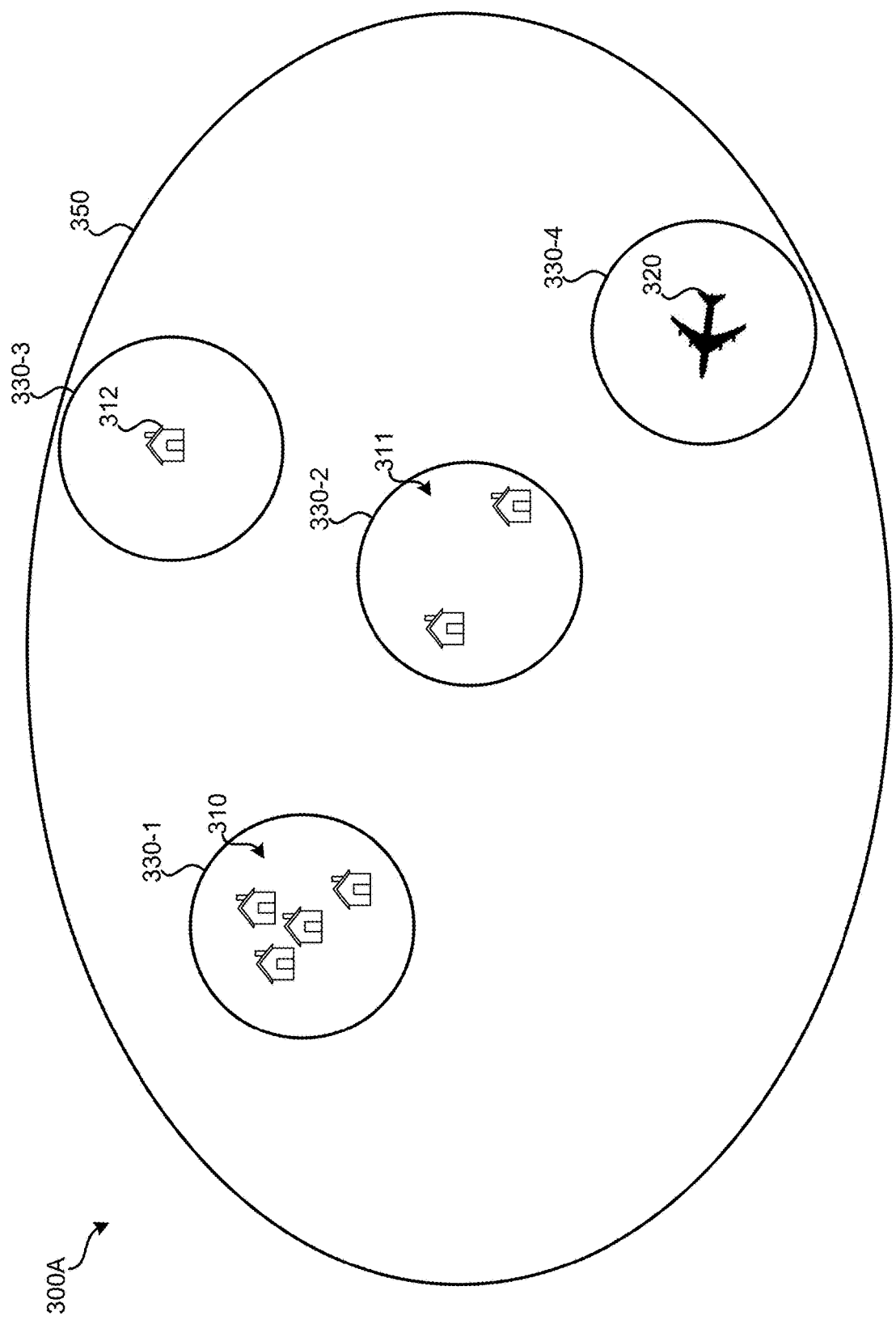
FIG. 3A illustrates an embodiment of spot beams and a wide-area beam being used to transmit and receive data via a satellite.

FIG. 3A illustrates an embodiment 300A of spot beams and a wide-area beam being used to transmit and receive data via a relay satellite, such as relay satellite 110. In embodiment 300A, various locations at which satellite antennas, user equipment, and user terminals are present are illustrated. Location group 310 illustrates multiple structures that are located a short distance from each other (e.g., within 1, 2, 3, or 5 miles). Location group 311 illustrates a sparse group of structures that are located a further distance apart from each other. Structure 312 illustrates a structure located a large distance from other structures that have user equipment installed. Airplane 320 has onboard user equipment for communicating with a satellite gateway system via a relay satellite.

Location group 310 may represent individual structures that are close enough together that a single spot beam antenna radiation pattern can be used to transmit and receive with a high level of gain. Spot beam patterns 330 may define regions in which signal strength and gain is within 0.3 dB to 2 dB of the signal strength (or sensitivity) at the center location of the respective spot beam pattern. In some embodiments, a small decrease in signal strength and sensitivity may be small enough that it is not necessary to individually target the user equipment at each structure. Rather, a single spot beam pattern may be used to communicate with user equipment at each structure. In some embodiments, location group 311 may represent a fewer number of structures than location group, but that may be close enough together that a single spot beam antenna radiation pattern can be used to transmit and receive with a high level of gain. Spot beam antenna pattern 330-2 may be used for transmitting to and receiving data from user equipment located at these structures by a relay satellite.

User equipment at structure 312 may be individually targeted with a spot beam antenna radiation pattern 330-3 of a relay satellite. In some embodiments, targeting user equipment means a center of a spot beam being aligned with the user equipment. For instance, center of spot beam 330-3 is centered on the location of structure 312 at which user equipment is located. In some embodiments, targeting user equipment means a center of the spot beam is located at a geographic location within a certain distance (e.g., one mile, two miles) of the location at which the structure is located. In some embodiments, targeting user equipment means the user equipment experiences less than 0.3 dB to 2 dB signal strength decrease as compared to the geographic location at a center of the spot beam.

Airplane 320 has on-board user equipment that is moving with airplane 320. As such, the location to be targeted using spot beam 330-4 is occasionally or continually changing. Spot beam 3304 may be occasionally retargeted such that airplane remains at or near a center of spot beam 330-4.

Wide-area beam 350 may be used to transmit and receive data from all user equipment illustrated in embodiment 300A. The edge of wide-area beam 350 (which may be understood as a larger spot-beam) may also be defined by a 3 dB decrease in signal strength as compared to the center of wide-area beam 350. Multiple wide-area spot beams may be used to cover a large geographic region. While the maximum signal gain and data throughput may be greatly decreased when an antenna radiation pattern of relay satellite 110 is used to produce wide-area beam 350, there may be less signal strength decrease over a wider area (hence the area of wide-area beam being illustrated as encompassing a much greater area). While for certain periods of time, spot beams 330 may be used for high gain and high data throughput communication with small regions, during other periods of time, wide-area beam 350 may be used to broadcast messages to multiple instances of user equipment and may be used to receive requests (e.g., requests for bandwidth) from instances of user equipment scattered within wide-area beam 350 or multicast data such as streamed video.

Figure 3B:
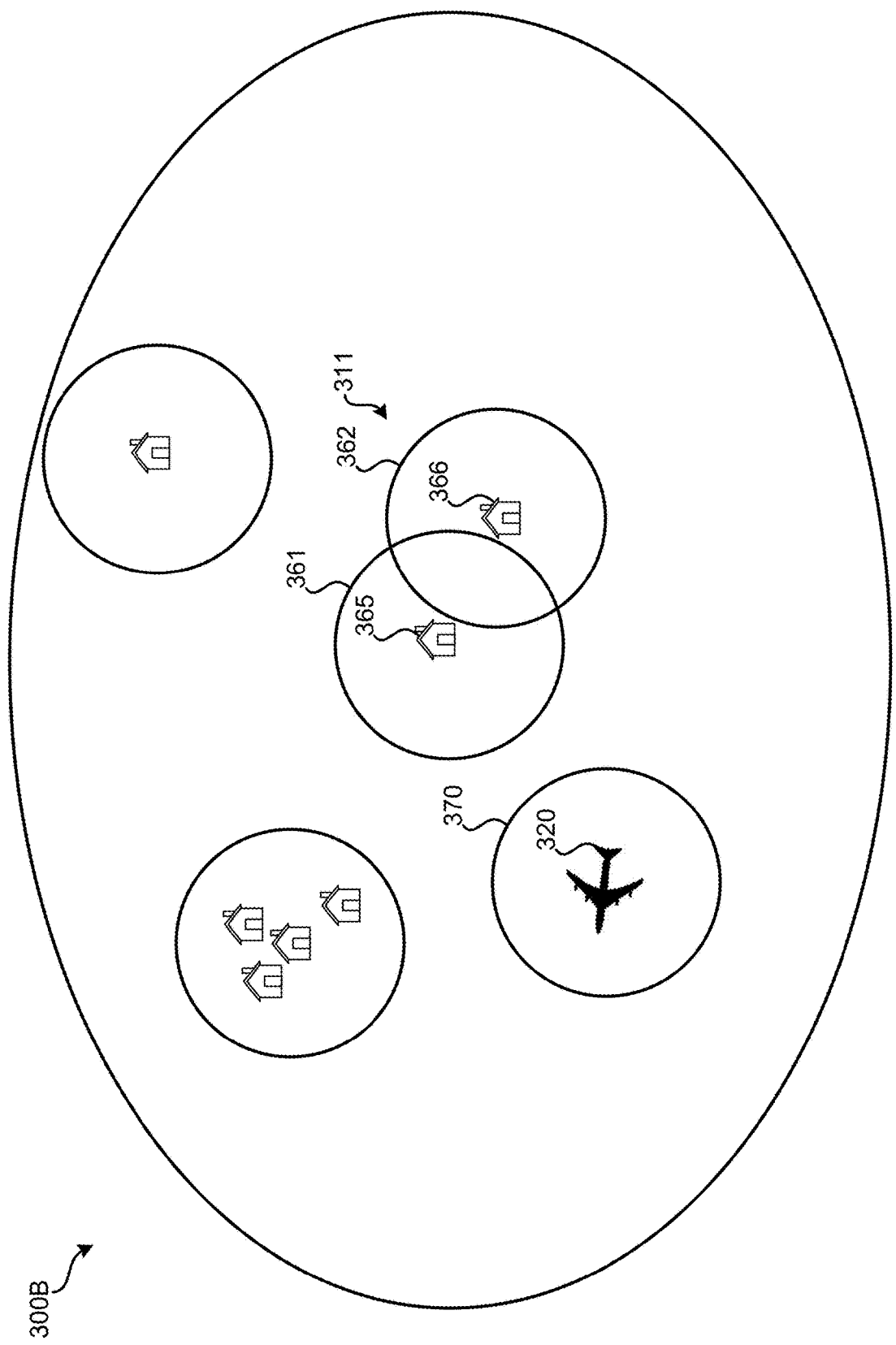
FIG. 3B illustrates another embodiment of spot beams and a wide-area beam being used to transmit and receive data via a relay satellite.

FIG. 3B illustrates an embodiment 300B of spot beams and a wide-area beam being used to transmit and receive data via a relay satellite. In embodiment 300B, rather than a single spot beam being used to target user equipment in location group 311, each structure receives its own spot beam. Even though these spot beams are illustrated as overlapping, these spot beams may not be active at a same time and/or may use different polarization (e.g., clockwise and counterclockwise) or frequency. Spot beam 361 created using a particular antenna radiation pattern of an antenna of relay satellite 110 may be used for transmission and reception of data for user equipment located at structure 365; spot beam 362 created using a different antenna radiation pattern of the antenna of relay satellite 110 may be used for transmission and reception of data with user equipment at structure 366.

Airplane 320 is illustrated in embodiment 300B as having moved from its location in embodiment 300A of FIG. 3A. A new spot beam produced by a different antenna radiation pattern of relay satellite 110 is produced. Spot beam 370 may be used for a period of time while airplane 320 is within a center region of spot beam 370. That is, spot beam 370 may not be repositioned for every data transmission with user equipment on airplane 320, but rather may be only occasionally updated such that airplane 320 experiences signal strength and sensitivity within 0.3 dB to 2 dB of a center of spot beam 370.

Figure 4:
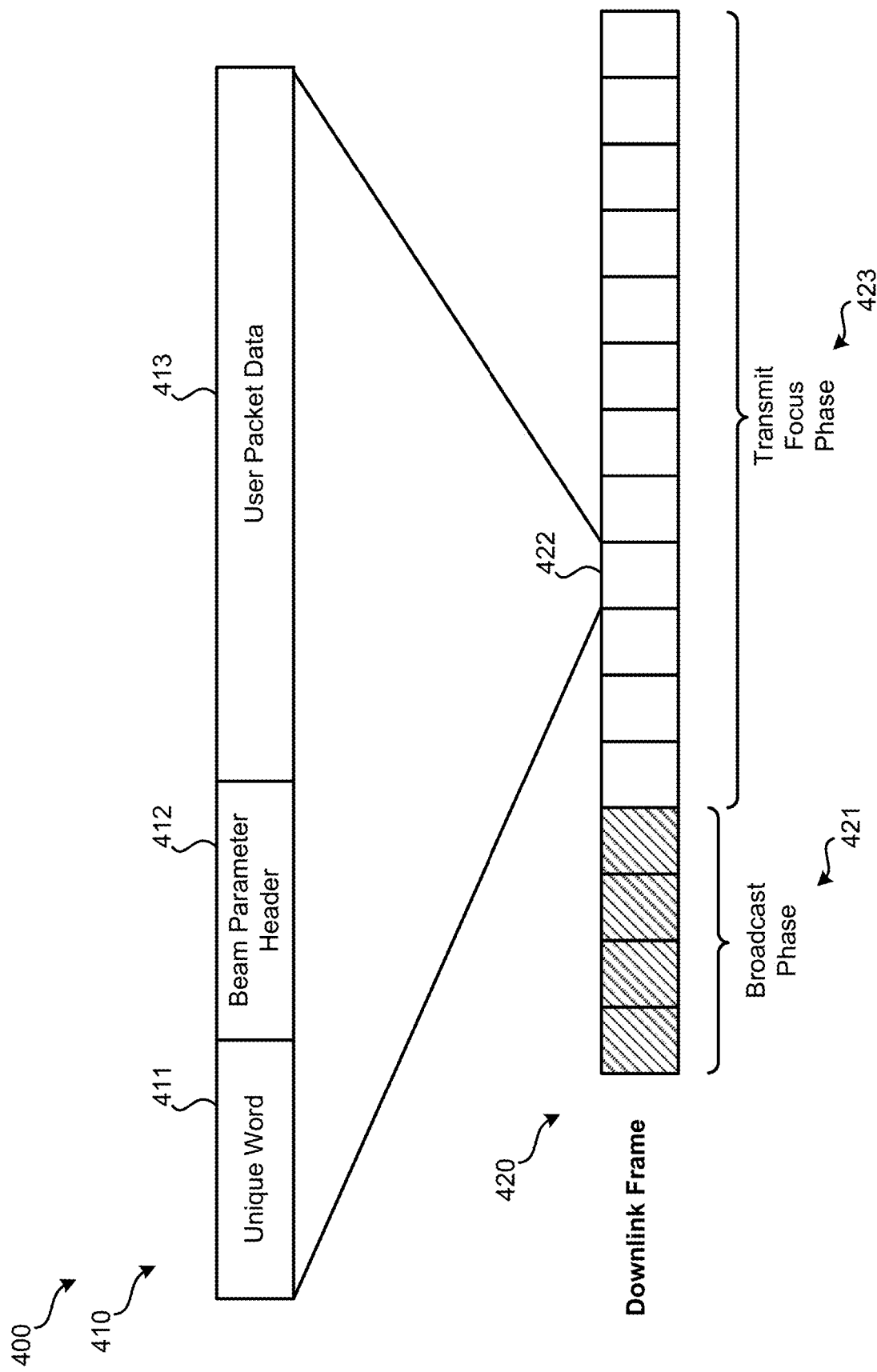
FIG. 4 illustrates an embodiment of data packets and a data frame that may be used to transmit data via wide-area and spot beams to user equipment via a relay satellite.

FIG. 4 illustrates an embodiment 400 of data packet 410 and downlink frame 420 that may be used to transmit data via wide-area and spot beams to user equipment via a relay satellite. Downlink frame 420 represents a series of data packets that are transmitted to a relay satellite, such as relay satellite 110, by a satellite gateway system, such as satellite gateway system 120-1. Downlink frame 420 may include a number of data packets that are part of broadcast phase 421 and a number of data packets that are part of transmit focus phase 423. A relay satellite may transmit each packet that is part of broadcast phase 421 to many instances of user equipment using a wide-area beam, such as wide-area beam 350. These data packets may include network or "housekeeping" data that is used by some or all instances of user equipment. Such data can include network settings, timing data, or other data that is used by multiple or all instances of user equipment. In some embodiments, low bandwidth data that needs to be transmitted to individual user equipment may be transmitted during broadcast phase 421, such as time slot assignments for when instances of user equipment are transmitting data to the relay satellite. During broadcast phase 421, the relay satellite may be caused to be configured to transmit the wide-area beam. This wide-area beam may have a relatively low data rate, but may exhibit a more consistent signal strength over a larger geographic region than a spot beam. Following a set portion of downlink frame being used for broadcast phase 421, the remainder of downlink frame 420 may be devoted to transmit focus phase 423.

During transmit focus phase 423, each instance of user equipment may be listening for data, as the individual user equipment instances may not have information that indicates if or when during transmit focus phase 423 one or more data packets are to be addressed to the specific instance of user equipment. Data packet 410 illustrates an example of a single data packet that may be part of downlink frame 420 during transmit focus phase 423. In some embodiments, data packet 410 may occupy a single slot 422 within downlink frame 420, as illustrated; alternatively, a data packet may occupy two or more slots within downlink frame 420.

Data packet 410 may include: unique word 411; beam parameter header 412; and user packet data 413. Unique word 411 may be used for timing purposes. Unique word 411 may represent a unique sequence of binary data that can be identified by the relay satellite and/or user equipment for timing purposes to ensure that data that is part of beam parameter header 412 and user packet data 413 are received properly. Unique word 411 may be a number that can be easily distinguished from other binary sequences that may be present within downlink frame 420. Beam parameter header 412 may include beam steering data that instructs beam forming equipment at the relay satellite how to configure communication hardware 250. In some embodiments, the beam steering data may include a beam identifier that can be used to perform a lookup in an on-board predefined beam table of the relay satellite to determine beam steering data. In other embodiments, the beam parameter header 412 may include the beam steering data.

User packet data 413 may be transmitted using the spot beam antenna radiation pattern determined based on the beam steering data obtained from beam parameter header 412. User packet data 413 may include an address that identifies the user equipment for which the data is addressed and may include a payload of data. In some embodiments, when the data packet is transmitted by the relay server, beam parameter header 412 may be removed since this data is needed only by the relay satellite. In other embodiments, beam parameter header 412 may be left in as part of data packet 410.

Each downlink frame 420 may be part of a larger super frame that includes multiple downlink frames. Each frame within the super frame may be assigned a unique identifier such that the frame can be distinguished from other frames within the super frame. The use of a super frame may help avoid timing errors due to the relatively large delay in communicating using a geosynchronous satellite.

Figure 5:
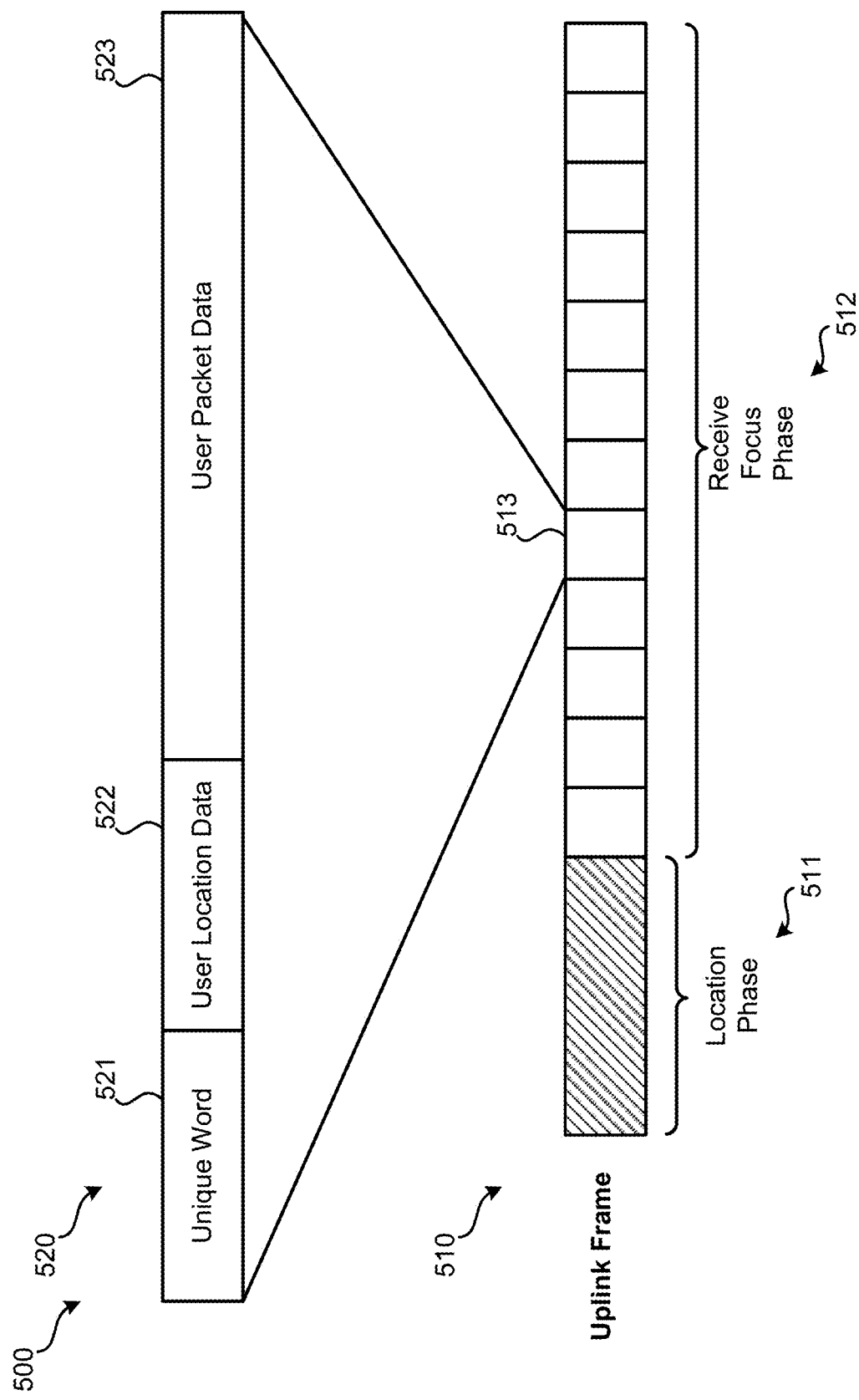
FIG. 5 illustrates an embodiment of data packets and a data frame that may be used to receive and relay data via wide-area and spot beams from user equipment via a relay satellite to a satellite gateway.

FIG. 5 illustrates an embodiment 500 of data packet 520 and uplink frame 510 that may be used to receive and relay data from user equipment via a relay satellite to a satellite gateway using wide-area and spot beam selectivity. Uplink frame 510 represents a time division multiple access (TDMA) arrangement that allows transmission to a relay satellite, such as relay satellite 110, by instances of user equipment. Uplink frame 510 may include multiple parts, including location phase 511 and receive focus phase 512.

During location phase 511, the relay satellite may form a receive beam by adjusting electrical characteristics of the satellite antenna being used to receive data such that the relay satellite can receive a low bandwidth of data over a wide-area, such as represented by wide-area beam 350 of FIG. 3A. During this time period, requests for uplink bandwidth (which can be referred to as a "reservation request") may be received from various instances of user equipment by the relay satellite. Requests transmitted during location phase 511 from instances of user equipment may include: 1) an indication of location; 2) an identifier of the user equipment (e.g., a MAC address, user account identifier, etc.); and 3) a request for an amount of bandwidth.

Since individual instances of user equipment can be unaware of when other instances of user equipment are going to transmit during location phase 511, collisions between data transmissions from user equipment to the relay satellite are possible. Various access techniques may be used to overcome these potential collisions for the location phase 511 of uplink frame 510. One possible technique that may be used is ALOHA. In ALOHA, any user equipment can transmit at any point during location phase 511. If no other user equipment transmits during this time, the message will be received by the relay satellite. If another instance of user equipment tries to transmit during this time, a collision will occur and both instances of user equipment will need to resend their respective messages. To resend, each instance of user equipment may wait a different amount of time and then attempt a resend. In a slotted ALOHA (S-ALOHA) arrangement, user equipment may only be permitted to begin transmitting a message at the beginning of defined timeslots within location phase 511. This arrangement may decrease a number of collisions.

In some embodiments, a sparse code multiple access (SCMA) communication technique may be used for the location phase 511 of uplink frame 510. In SCMA, a defined set of codes (possibly referred to as a "codebook") may be transmitted by user equipment, with each code represented as an alphanumeric code that includes a greater number of bits. This arrangement may allow for a situation in which a collision between multiple transmitting user equipment occurs; however, the relay satellite or satellite gateway system is able to determine the code sent by each instance of user equipment since each code is sent using a longer alphanumeric code that is significantly different from other alphanumeric codes used for other defined codes in the defined set of codes. That is, the satellite gateway system or the relay satellite can make a likely guess as to the intended codes from the multiple transmissions from user equipment that have collided.

In some embodiments, a code division multiple access (CDMA) communication technique may be used for the location phase 511 of uplink frame 510. In a CDMA arrangement, rather than having a fixed set of codes or codebook, the codes are computed based on a pre-established algorithm by the user equipment, relay satellite, and/or satellite gateway system. Similar to SCMA, this arrangement can allow for collided messages to be successfully decoded by the satellite gateway system or relay satellite. Since no fixed set of codes is used, the amount of processing necessary to perform a CDMA communication technique may be greater than in a SCMA arrangement.

During receive focus phase 512, certain time slots may be assigned to individual instances of user equipment. An instance of user equipment may have previously received a message from the relay satellite. This message may originate from the relay satellite or may be relayed by the relay satellite from a satellite gateway system. This message may inform the user equipment when one or more time slots occur during which the relay satellite will be targeting a receive spot beam on the user equipment. This message to the user equipment may have been transmitted during a previous downlink frame, such as during broadcast phase 421 or during transmit focus phase 423 when the spot beam is targeted on the corresponding instance of user equipment.

During receive focus phase 512, each timeslot may be assigned to a particular instance of user equipment. During the user equipment's assigned time slot, the user equipment may transmit one or more data packets while the relay satellite is targeting the user equipment with a receive spot beam. This receive spot beam may be similar to a spot beam such as spot beam 330-3—allowing for the user equipment to transmit at a high data rate to the relay satellite while the receive spot beam is targeted on the user equipment.

Data packet 520 may be transmitted by an instance of user equipment during time slot 513. Data packet 520 may include: unique word 521, user location data 522, and user packet data 523. Unique word 521 may be used for timing purposes. Unique word 521 may represent a unique sequence of binary data that can be identified by the relay satellite and/or user equipment for timing purposes to ensure that data that is part of user location data 522 and user packet data 523 are received properly. Unique word 521 may be a number that can be easily distinguished from other binary sequences that may be present within uplink frame 510. User location data 522 may be data that indicates the current location of the user equipment. For stationary user equipment, user location data 522 may be an account identifier or a user equipment identifier. For both stationary user equipment or mobile user equipment, user location data 522 may be latitude and longitude coordinates or some other form of coordinates that can be used to determine the precise location of the user equipment. User packet data 523 may represent the data that the user equipment intends to transmit to the satellite gateway system, such as a request for a webpage from the Internet or an upload of a file.

Each uplink frame 510 may be part of a larger uplink super frame that includes multiple uplink frames. Each uplink frame within the uplink super frame may be assigned a unique identifier such that the uplink frame can be distinguished from other frames within the super frame. The use of an uplink super frame may help avoid timing errors due to the relatively large delay in communicating using a geosynchronous satellite.

It should be understood that the ordering and relative length of various portions of the data packets and frames is merely exemplary. Similarly, the ordering and duration of the broadcast phase, transmit focus phase, location phase, and receive focus phase may be altered.

Figure 6:
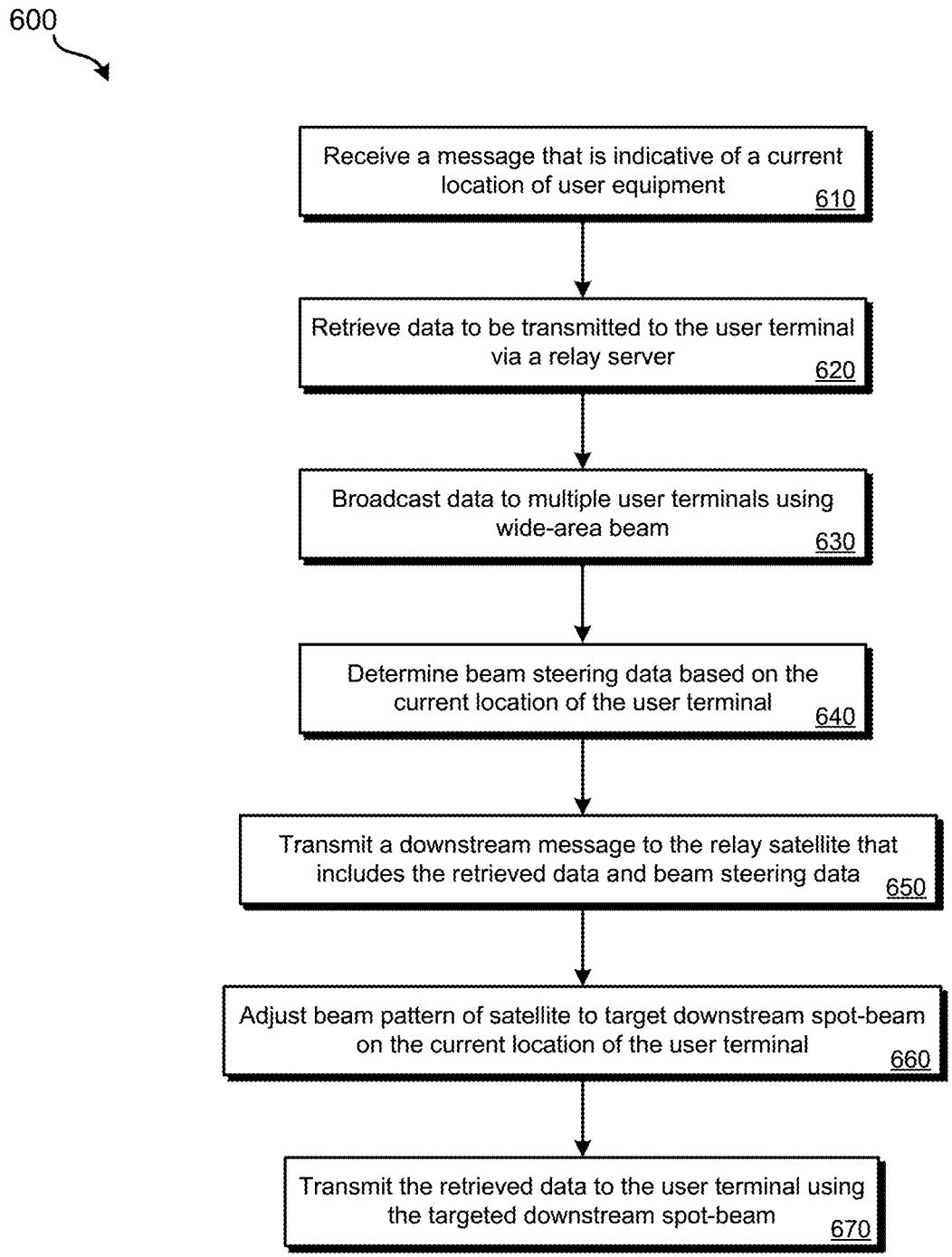
FIG. 6 illustrates an embodiment of a method for optimizing data transmission from a relay satellite to a user terminal.

Various methods may be performed using the embodiments detailed in relation to FIGS. 1-5. FIG. 6 illustrates an embodiment of a method 600 for optimizing data transmission from a relay satellite to a user terminal. Each block of method 600 may be performed using one or more satellite gateway systems, one or more bidirectional satellite communication links, one or more relay satellites, and one or more instances of user equipment (which each instance can include a satellite antenna, satellite communication modem, router, and/or one or more user terminals).

At block 610, a message that is indicative of a current location of the user terminal may be received by a relay satellite and processed locally or may be received by the relay satellite and relayed to a ground-based satellite gateway system. Therefore, at block 610, the message including the current location of the user equipment may be received by the satellite gateway system. The current location may be indicated in the message in the form of latitude and longitude coordinates, a user equipment identifier, or an account identifier. Some other form of unique identifier may also be used that can be used to look up a location of the user equipment in a database. Such a lookup may only be possible if the user equipment is not expected to move. For situations in which the user equipment may constantly or occasionally be changing location, the message may include position coordinates. The message that is received by the relay satellite and, possibly, the satellite gateway system may be in the form of data packet 520. Such a data packet may be transmitted during location phase 511 (when a wide-area receive beam of the relay satellite is active) of an uplink frame or may be transmitted during receive focus phase 512 during a time slot that has previously been assigned to the user equipment that transmitted the message. The message received at block 610 may also request data be retrieved from a source, such as the Internet or a private data source. For instance, the message received at block 610 may request a URL.

At block 620, the data requested to be retrieved at block 610 may be obtained, such as from the Internet or from a private data source. This may involve the satellite gateway system accessing the Internet or the private data source to obtain the requested data.

At block 630, data may be broadcast to multiple instances of user equipment using a wide area beam. This wide-area beam may have a low data bandwidth but may be effectively received by user equipment scattered over a large geographic region. Referring to downlink frame 420, such broadcast data may be transmitted during broadcast phase 221. For instance, this broadcast data may be used to assign user equipment with particular uplink timeslots for a future uplink frame.

For data to be transmitted to the user terminal from which the request to retrieve data was received at block 610, the satellite gateway system or the relay satellite may determine beam steering data at block 640 based on the current location of the user terminal that was indicated in the message of block 610. As previously detailed, determining beam steering data may include: 1) performing a look-up in a database or table of locations stored by the satellite gateway system or relay satellite based on a user equipment identifier or an account identifier; 2) calculating beam steering data based on user equipment location coordinates or location by the satellite gateway system or relay satellite; and/or 3) performing a look-up in a database or table of beam steering data based on coordinates, an address, a user equipment identifier, or an account identifier by the satellite gateway system or relay satellite.

At block 650, if the beam steering data was determined at the satellite gateway system, a downlink message may be transmitted to the relay satellite that includes user packet data to be transmitted to the user equipment and beam steering data used to define a spot to target the user equipment to receive the downlink message. This user equipment may be the same user equipment from which the message was received at block 610 and included in the current location of the user equipment. If the beam steering data was determined at the relay satellite, the beam steering data may be stored locally by the relay satellite until the user packet data is to be transmitted to the user equipment.

At block 660, the antenna radiation beam pattern of the satellite may be set to target a downlink spot beam on the current location of the user equipment, using the received beam steering data. Referring to downlink frame 420, this may occur during transmit focus phase 423 for one or more timeslots of data packets. Block 660 may include beamforming equipment 240 of relay satellite 110 altering electronic configuration of communication hardware 250 based on the beam steering data received or otherwise obtained at block 650. As previously detailed, targeting the antenna radiation beam pattern of the satellite may be done so that the user equipment is at the center or near the center of the spot beam on the surface of the earth. In other embodiments, targeting the antenna radiation beam pattern of the satellite to create the spot beam may be done so that the user equipment is within a predefined distance of the center of the spot beam on the surface of the earth. In other embodiments, targeting the antenna radiation beam pattern of the satellite to create the spot beam may be done so that the user equipment receives within 0.5 dB to 2 dB of the signal strength of the center of the spot beam.

At block 670, one or more packets, which may be in the form of data packet 410, may be transmitted to the user equipment by the relay satellite using the downlink spot beam formed at block 660. In some embodiments, if a beam parameter header 412 was present when the data packet was transmitted to the relay server from the satellite gateway system, beam parameter header 412 may be removed. Other data packets may be targeted to other user equipment using different antenna radiation beam patterns defined by corresponding beam steering data. Therefore, within a single downlink frame, different data packets may be targeted to different instances of user equipment using different spot beams. Following block 670, the user equipment may receive and process the retrieved data.

Figure 7:
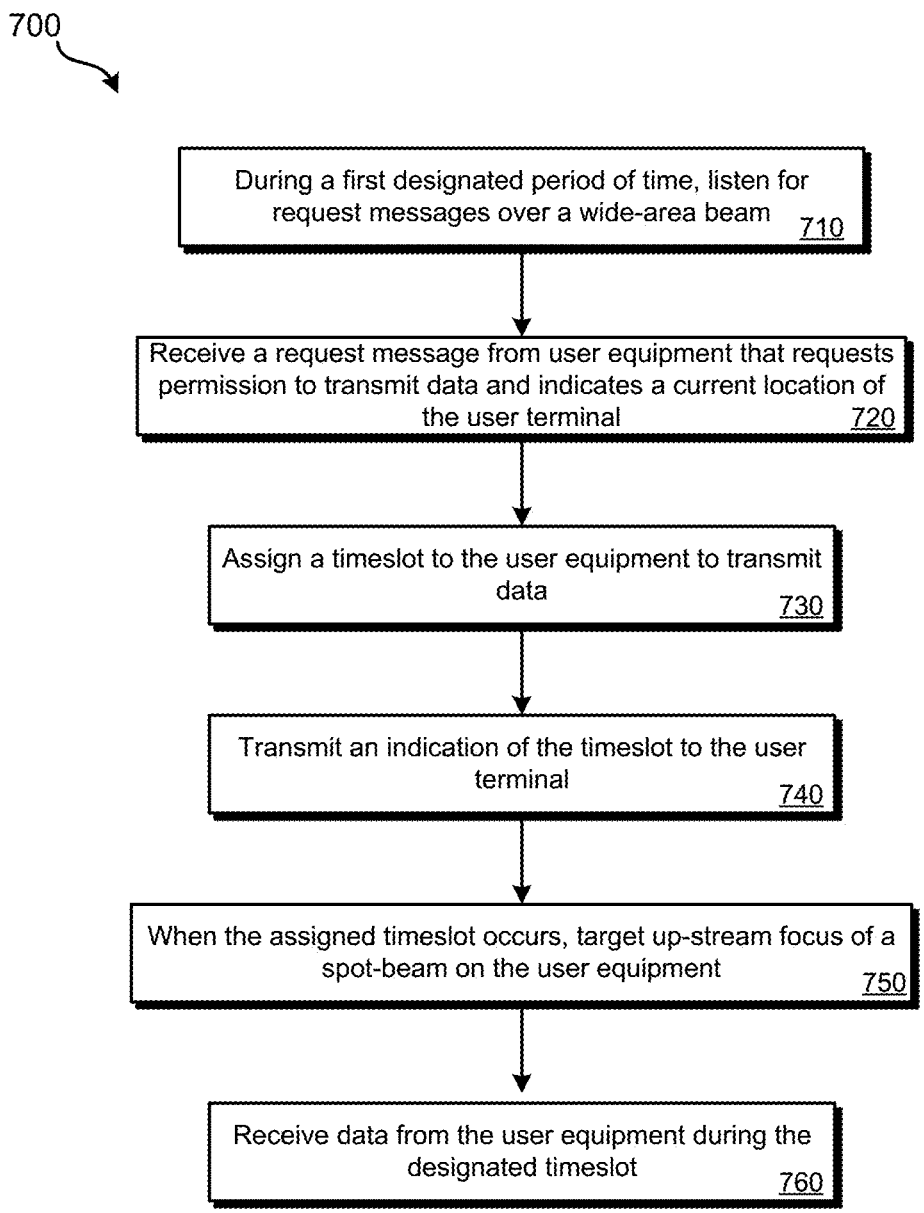
FIG. 7 illustrates an embodiment of a method for optimizing data transmission to a relay satellite from a user terminal.

FIG. 7 illustrates an embodiment of a method 700 for optimizing data transmission to a relay satellite from a user terminal. Each block of method 700 may be performed using one or more satellite gateway systems, one or more bidirectional satellite communication links, one or more relay satellites, and one or more instances of user equipment (which each instance can include a satellite antenna, satellite communication modem, router, and/or one or more user terminals). At block 710, during a first designated period of time, a relay satellite may listen for request messages, using a wide-area receive beam that has been created using a receive beam former that adjusts the antenna radiation pattern of an antenna of the satellite. This first designated period of time may occur during a location phase of an uplink frame, such as location phase 511 of uplink frame 510. Collisions between multiple communications from different instances of user equipment may be handled as previously detailed in relation to embodiment 500.

At block 720, a request message may be received from an instance of user equipment that requests permission to transmit data and indicates a current location of the user terminal. The request message of block 720 may refer to the same request message as block 610 of method 600. As with block 710, block 720 may occur during the location phase of an uplink frame, such as location phase 511 of uplink frame 510. The request for the permission to transmit data may include a request for a certain amount of bandwidth. That is, the user equipment may indicate an amount of data that is to be transmitted to the satellite gateway system via the relay satellite.

At least partially in response to the request for permission to transmit data, the satellite gateway system or the relay satellite may assign a time slot to the user equipment to transmit data at block 730. In some embodiments, a receive time plan generator system is incorporated as part of the satellite gateway system that is responsible for assigning timeslots for user equipment to transmit data to the relay satellite. Referring to uplink frame 510, this may include one or more timeslots within receive focus phase 512 of an uplink frame, which may be a later uplink frame from the uplink frame used for communication at block 720. That is, a request for bandwidth may be transmitted in the first uplink frame, but one or more timeslots may not be assigned until a second, later uplink frame by the satellite gateway system or the relay satellite.

At block 740, an indication of the timeslot assigned to the user equipment may be transmitted by the satellite gateway system to the user equipment via the relay satellite, or may be determined by the relay satellite and transmitted directly to the user equipment.

When the assigned timeslot occurs at block 750, a receive spot beam may be formed and targeted on the user equipment. Based on the location of the user equipment, the satellite gateway system may provide beam steering data to the relay satellite or the relay satellite may determine such beamforming data on its own. Determining beam steering data may include: 1) performing a look-up in a database or table of locations stored by the satellite gateway system or relay satellite based on a user equipment identifier or an account identifier; 2) calculating beam steering data based on user equipment location coordinates or location by the satellite gateway system or relay satellite; and/or 3) performing a look-up in a database or table of beam steering data based on coordinates, an address, a user equipment identifier, or an account identifier by the satellite gateway system or relay satellite.

At block 760, data may be received by the relay satellite using the targeted receive spot beam during the assigned timeslot. Since multiple timeslots are present within an uplink frame, multiple targeted receive spot beams may be targeted at different user equipment during different assigned timeslots such that each of the instances of user equipment can obtain the high-bandwidth available via a high-frequency and high-bandwidth targeted spot beam.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for optimizing data transmission between a satellite and a user equipment, the method comprising:
   receiving, by a satellite gateway system via the satellite, a message from the user equipment indicative of a current location of the user equipment;
   receiving, by the satellite gateway system via the satellite, a request from the user equipment to send data to the satellite gateway system via the satellite;
   assigning, by the satellite gateway system, a time slot for the user equipment to transmit the amount of data to the satellite gateway system;
   transmitting, by the satellite gateway system via the satellite, a time slot assignment message to the user equipment that indicates the time slot;
   causing, by the satellite gateway system, the satellite to target up-stream focus for the time slot on the current location of the user equipment; and
   receiving, by the satellite gateway system via the satellite, data from the user equipment transmitted during the time slot.

2. The method for optimizing data transmission between the satellite and the user equipment of claim 1, further comprising:
   transmitting beam steering data instructing the satellite to target up-stream focus on the current location of the user equipment such that up-stream focus is centered on the current location of the user equipment.

3. The method for optimizing data transmission between the satellite and the user equipment of claim 1, further comprising:
   transmitting beam steering data instructing the satellite to target up-stream focus on the current location of the user equipment such that up-stream focus is centered within a predefined distance on the current location of the user equipment.

4. The method for optimizing data transmission between the satellite and the user equipment of claim 3, further comprising:
   storing, by the satellite, a lookup table that maps a plurality of spot beam identifiers to a corresponding plurality of spot beam target locations, wherein the beam steering data comprises a spot beam identifier; and
   performing, by the satellite, a lookup in the lookup table based on the beam steering data; and
   performing, by the satellite, a beam-forming process based on the lookup to target up-stream focus on the user equipment.

5. The method for optimizing data transmission between the satellite and the user equipment of claim 1, wherein the message indicative of the current location of the user equipment comprises an account number linked with the user equipment.

6. The method for optimizing data transmission between the satellite and the user equipment of claim 1, wherein the message indicative of the current location of the user equipment comprises a latitude value and a longitude value.

7. The method for optimizing data transmission between the satellite and the user equipment of claim 1, further comprising:
   transmitting, by the satellite gateway system, a downlink message to the satellite that comprises broadcast data to be transmitted to a plurality of instances of user equipment that comprises the user equipment, wherein the downlink message is to be transmitted via one or more downlink wide area beams.

8. The method for optimizing data transmission between the satellite and the user equipment of claim 7, wherein a frequency of an uplink transmission from the user equipment is 30 GHz or greater.

9. The method for optimizing data transmission between the satellite and the user equipment of claim 1, wherein the message from the user equipment indicative of the current location of the user equipment and the request from the user equipment to send data to the satellite gateway system via the satellite are transmitted as part of a same message.

10. A system optimizing data transmission, the system comprising:
    user equipment comprising a first satellite antenna that transmits, to a satellite, a message indicative of a current location of the user equipment; and
    a satellite gateway system comprising: a second satellite antenna that communicates with the satellite, wherein the satellite gateway system is configured to:
       receive, via the satellite, a message from the user equipment indicative of a current location of the user equipment;
       receive, via the satellite, a request from the user equipment to send data to the satellite gateway system via the satellite;
       assign a time slot for the user equipment to transmit the amount of data to the satellite gateway system;
       transmit, via the satellite, a time slot assignment message to the user equipment that indicates the time slot;
       cause, by the satellite gateway system, the satellite to target up-stream focus for the time slot on the current location of the user equipment; and
       receive, via the satellite, data from the user equipment transmitted during the time.

11. The system for optimizing data transmission of claim 10, wherein the satellite gateway system is further configured to transmit beam steering data to the satellite for targeting up-stream focus on the current location of the user equipment.

12. The system for optimizing data transmission of claim 11, further comprising the satellite, wherein the satellite relays the time slot assignment message to the user equipment.

13. The system for optimizing data transmission of claim 11, further comprising the satellite, wherein causing the satellite to target up-stream focus comprises the satellite targeting up-stream focus within a predefined distance on the current location of the user equipment.

14. The system for optimizing data transmission of claim 11, wherein the satellite is configured to:
store a lookup table that maps a plurality of spot beam identifiers to a corresponding plurality of spot beam target locations, wherein the beam steering data comprises a spot beam identifier;
perform a lookup in the lookup table based on the beam steering data; and
perform a beam-forming process based on the lookup to target up-stream focus on the user equipment based on the lookup.

15. The system for optimizing data transmission of claim 10, wherein the message indicative of the current location of the user equipment comprises an account number linked with the user equipment.

16. The system for optimizing data transmission of claim 10, wherein the message indicative of the current location of the user equipment comprises a latitude value and a longitude value.

17. The system for optimizing data transmission of claim 10, wherein the message from the user equipment indicative of the current location of the user equipment and the request from the user equipment to send data to the satellite gateway system via the satellite are transmitted as part of a same message.

18. The system for optimizing data transmission of claim 10, wherein the satellite gateway system is further configured to:
transmit a downlink message to the satellite that comprises broadcast data to be transmitted to a plurality of instances of user equipment that comprises the user equipment, wherein the downlink message is to be transmitted via one or more downlink wide area beams distributed over a large geographical area.

19. The system for optimizing data transmission of claim 18, wherein a frequency of an uplink transmission from the user equipment is 30 GHz or greater.

20. A non-transitory processor-readable medium for a satellite gateway system, comprising processor-readable instructions configured to cause one or more processors to:
receive a message from a user equipment indicative of a current location of the user equipment;
receive a request from the user equipment to send data to the satellite gateway system via a satellite;
assign a time slot for the user equipment to transmit the amount of data to the satellite gateway system;
transmit a time slot assignment message to the user equipment that indicates the time slot;
cause the satellite to target up-stream focus for the time slot on the current location of the user equipment; and
receive data from the user equipment transmitted during the time.

* * * * *